(12) United States Patent
Tanner et al.

(10) Patent No.: US 6,602,410 B1
(45) Date of Patent: Aug. 5, 2003

(54) WATER PURIFYING KITS

(75) Inventors: John D. Tanner, Plymouth, MN (US); David J. Emmons, Plymouth, MN (US); Ward William Ostendorf, West Chester, OH (US); Kathleen Grieshop Baier, Cincinnati, OH (US); Jesus Velazquez, West Chester, OH (US); Christy Ann Olson, Little Rock, AR (US); Philip Frank Souter, Northumberland (GB); Colin Ure, Tyne & Wear (GB)

(73) Assignee: The Procter & Gamble Comapny, Cincinnati, OH (US)

( * ) Notice: Subject to any disclaimer, the term of this patent is extended or adjusted under 35 U.S.C. 154(b) by 35 days.

(21) Appl. No.: 09/712,464

(22) Filed: Nov. 14, 2000

(51) Int. Cl.[7] .............................. C02F 1/56; C02F 1/52; B01D 36/02

(52) U.S. Cl. ................... 210/201; 210/266; 210/282; 210/474; 210/489; 210/728; 210/730; 210/734; 210/738

(58) Field of Search ................. 210/201, 474, 210/489, 282, 266, 728, 734, 738, 730

(56) References Cited

U.S. PATENT DOCUMENTS

| | | | |
|---|---|---|---|
| 2,335,458 A | | 11/1943 | Senyal |
| 3,392,837 A | * | 7/1968 | Sanzenbacher |
| 3,497,071 A | * | 2/1970 | Mineo |
| 3,556,932 A | | 1/1971 | Coscia et al. |
| 3,556,933 A | | 1/1971 | Williams et al. |
| 3,700,623 A | | 10/1972 | Keim et al. |
| 3,772,076 A | | 11/1973 | Keim |
| 3,994,771 A | | 11/1976 | Morgan, Jr. et al. |
| 4,033,881 A | | 7/1977 | Pall |
| 4,075,107 A | | 2/1978 | Smith |
| 4,094,779 A | * | 6/1978 | Behrman |
| 4,127,482 A | | 11/1978 | Watson et al. |
| 4,191,609 A | | 3/1980 | Trokhan |
| 4,191,756 A | | 3/1980 | Masi et al. |
| 4,218,316 A | | 8/1980 | Watson et al. |
| 4,225,382 A | | 9/1980 | Kearney et al. |
| 4,300,981 A | | 11/1981 | Carstens |

(List continued on next page.)

FOREIGN PATENT DOCUMENTS

| | | |
|---|---|---|
| DE | 15 17 582 A | 1/1970 |
| DE | 195 44 455 A1 | 6/1997 |
| EP | 0 542 092 A1 | 5/1993 |
| FR | 751 732 A | 9/1933 |
| GB | 1023335 * | 3/1966 |
| JP | 09158026 A | 6/1997 |
| WO | WO 91 14389 A | 10/1991 |
| WO | WO 97/28882 | 8/1997 |
| WO | WO 99/22861 | 5/1999 |
| WO | WO 00/43048 | 7/2000 |
| WO | WO 00/58094 | 10/2000 |
| WO | WO 00/72940 A1 | 12/2000 |
| WO | WO 01/07090 A1 | 2/2001 |

OTHER PUBLICATIONS

US 5,972,466, 10/1999, Trokhan (withdrawn)
Cabell, D. et al., "Multi–Layer Deflection Member and Process for Making Same", *U.S. patent application Ser. No. 09/694,946*, 125 pgs. (Filed Oct. 24, 2000 in the U.S. PTO).

(List continued on next page.)

*Primary Examiner*—Thomas M. Lithgow
(74) *Attorney, Agent, or Firm*—Richard L. Alexander; James C. Vago

(57) ABSTRACT

A kit for purifying water comprises a first container for receiving untreated water, and a second container for receiving purified water and having a dispensing spigot. A water purification composition, when mixed with water in the first container, produces partially purified water having solid matter. A first filter held in a filter holder at an upper end of the second container removes the solid matter when the partially purified water is poured from the first container. A second filter in the second container comprises carbon.

40 Claims, 7 Drawing Sheets

U.S. PATENT DOCUMENTS

| | | | |
|---|---|---|---|
| 4,305,782 A | | 12/1981 | Ostreicher et al. |
| 4,440,597 A | | 4/1984 | Wells et al. |
| 4,505,823 A | * | 3/1985 | Klein |
| 4,514,345 A | | 4/1985 | Johnson et al. |
| 4,528,239 A | | 7/1985 | Trokhan |
| 4,529,480 A | | 7/1985 | Trokhan |
| 4,557,800 A | | 12/1985 | Kinsley, Jr. |
| 4,637,859 A | | 1/1987 | Trokhan |
| 4,684,471 A | * | 8/1987 | Manojlovic |
| 4,684,741 A | | 8/1987 | Prud'Homme |
| 4,828,698 A | | 5/1989 | Jewell et al. |
| 4,981,591 A | | 1/1991 | Ostreicher |
| 5,023,012 A | | 6/1991 | Buchan et al. |
| 5,071,587 A | | 12/1991 | Perman |
| 5,114,537 A | | 5/1992 | Scott et al. |
| 5,186,830 A | * | 2/1993 | Rait |
| 5,245,025 A | | 9/1993 | Trokhan et al. |
| 5,294,475 A | | 3/1994 | McNeil |
| 5,320,773 A | | 6/1994 | Perman et al. |
| 5,328,565 A | | 7/1994 | Rasch et al. |
| 5,334,289 A | | 8/1994 | Trokhan et al. |
| 5,364,504 A | | 11/1994 | Smurkoski et al. |
| 5,411,636 A | | 5/1995 | Hermans et al. |
| 5,456,844 A | | 10/1995 | Lobb |
| 5,468,323 A | | 11/1995 | McNeil |
| 5,503,740 A | * | 4/1996 | Callaghan et al. |
| 5,527,428 A | | 6/1996 | Trokhan et al. |
| 5,538,629 A | | 7/1996 | Blaney et al. |
| 5,554,288 A | | 9/1996 | Rydell et al. |
| 5,556,509 A | | 9/1996 | Trokhan et al. |
| 5,593,580 A | | 1/1997 | Kopf |
| 5,609,725 A | | 3/1997 | Van Phan |
| 5,609,947 A | | 3/1997 | Kamei et al. |
| 5,618,622 A | | 4/1997 | Gillberg-Laforce et al. |
| 5,662,808 A | | 9/1997 | Blaney et al. |
| 5,679,222 A | | 10/1997 | Rasch et al. |
| 5,681,475 A | | 10/1997 | Lamensdorf et al. |
| 5,688,588 A | | 11/1997 | Cotton et al. |
| 5,693,406 A | | 12/1997 | Wegele et al. |
| 5,709,775 A | | 1/1998 | Trokhan et al. |
| 5,718,827 A | | 2/1998 | Rydell et al. |
| 5,776,312 A | | 7/1998 | Trokhan et al. |
| 5,795,440 A | | 8/1998 | Ampulski et al. |
| 5,811,004 A | | 9/1998 | Robertson et al. |
| 5,830,367 A | | 11/1998 | Gadsby |
| 5,837,103 A | | 11/1998 | Trokhan et al. |
| 5,846,418 A | | 12/1998 | Thompson et al. |
| 5,855,788 A | | 1/1999 | Everhart et al. |
| 5,858,554 A | | 1/1999 | Neal et al. |
| 5,900,122 A | | 5/1999 | Huston |
| 5,906,710 A | | 5/1999 | Trokhan |
| 5,935,381 A | | 8/1999 | Trokhan et al. |
| 5,938,893 A | | 8/1999 | Trokhan et al. |
| 5,938,918 A | | 8/1999 | Kidd |
| 6,030,690 A | | 2/2000 | McNeil et al. |
| 6,071,602 A | | 6/2000 | Caldwell |
| 6,086,715 A | | 7/2000 | McNeil |
| 6,113,723 A | | 9/2000 | McNeil et al. |
| 6,129,841 A | * | 10/2000 | Dann |
| 6,149,826 A | | 11/2000 | Sato et al. |
| 6,169,045 B1 | | 1/2001 | Pike et al. |

OTHER PUBLICATIONS

Chapter entitled "Chapter 8—Coagulation and Flocculation", *The NACLO WATER HANDBOOK*, 2nd Edition, Part 2 (Unit Operations of Water Treatment), pp. 8.3–8.23 (Date unknown).

Miller, B. et al., "Liquid Porosimetry: New Methodology and Applications", *Journal of Colloid and Interface Science*, vol. 162, No. 1, pp. 163–170 (Jan. 1994).

Ostendorf, W. et al., "Embossed Cellulosic Fibrous Structure", *U.S. patent application Ser. No. 09/677,654*, 30 pgs. (Filed Oct. 3, 2000 in the U.S. PTO).

* cited by examiner

WATER PURIFYING KITS

FIELD OF THE INVENTION

The present invention relates to treatment of water and more particularly to kits for purifying water.

BACKGROUND OF THE INVENTION

There is a need for potable water in all areas of the world. In developed countries, water is purified and potable water is supplied on a large scale, typically by large national or multinational water management companies. This water is typically supplied directly to consumers' homes in a potable form. However, in some parts of the world, for example in some rural areas of developing countries, many people either do not have a direct water supply to their homes and only have access to a non-potable communal water supply such as a village well, or cannot be guaranteed that the water they do receive is potable.

It is known to produce potable water using a flocculent composition. Flocculent is mixed with the source water, typically a number of times, until large particles ("flocs") are coagulated that include various contaminants. These particles are then removed from the treated water, for example by pouring the water through a filtering material, to produce purified water.

The kits available to date which purify water in this manner have been crude. Typically they consist of a flocculent composition and a cloth. Two basic containers, such as buckets, are typically supplied by the consumer. The flocculent is mixed with water in the first bucket until ready. The cloth is then typically held by hand over the second bucket. The treated water is poured from the first bucket through the cloth and into the second bucket. Clean water is then drawn or poured from the second bucket as needed.

Prior kits suffer from a number of shortcomings. One is that the floc filtering arrangement is not effective or easy to use. Another is that chlorine produced by flocculent treatment remains in the water, which has an undesirable taste. Another shortcoming is that the buckets are not convenient to use.

Accordingly, there is a need for a water purification kit that produces potable, clean and good tasting water quickly and efficiently, and that is easy to use.

SUMMARY OF THE INVENTION

In one aspect of the invention, a water purification kit comprises a first container, a second container, a water purification composition, a filter holder, and a filter. The first container is for receiving untreated water, and the second container is for receiving purified water. The water purification composition, when mixed with water in the first container, produces partially purified water having solid matter. The filter holder is supported by the second container, and the filter is held in the filter holder. Purified water is obtained by pouring the partially purified water from the first container, through the filter and filter holder, and into the second container, thereby removing the solid matter.

In another aspect of the invention, a water purification kit comprises a water purification composition, a first filter and a second filter. The water purification composition, when contacted with water, produces partially purified water having solid matter. The first filter is capable of removing the solid matter when the partially purified water is passed through it. The second filter comprises carbon.

In another aspect of the invention, a water purification kit comprises a first container, a second container, a water purification composition, a first filter and a second filter. The first container is for receiving untreated water, and the second container is for receiving purified water. The second container has a spigot for dispensing purified water. The water purification composition, when mixed with water in the first container, produces partially purified water having solid matter. The first filter is held proximate an upper end of the second container and is for removing the solid matter when the partially purified water is poured from the first container into the second container. A second filter in the second container comprises carbon. Optionally, the second filter is located proximate an outlet of the second container such that purified water passes through the second filter just prior to exiting the spigot. Also optionally, the second filter is sealingly held between upper and lower chambers of the second container such that purified water passes from the first chamber, through the second filter, and into the second chamber, from which purified water is dispensed.

Other aspects of the invention, including methods of using a kit, are apparent from the detailed description below.

BRIEF DESCRIPTION OF THE DRAWINGS

Preferred embodiments of the invention will be described with reference to the accompanying drawings, wherein like reference numerals identify corresponding parts.

DETAILED DESCRIPTION OF THE PREFERRED EMBODIMENTS

First Embodiment

Figure 1:
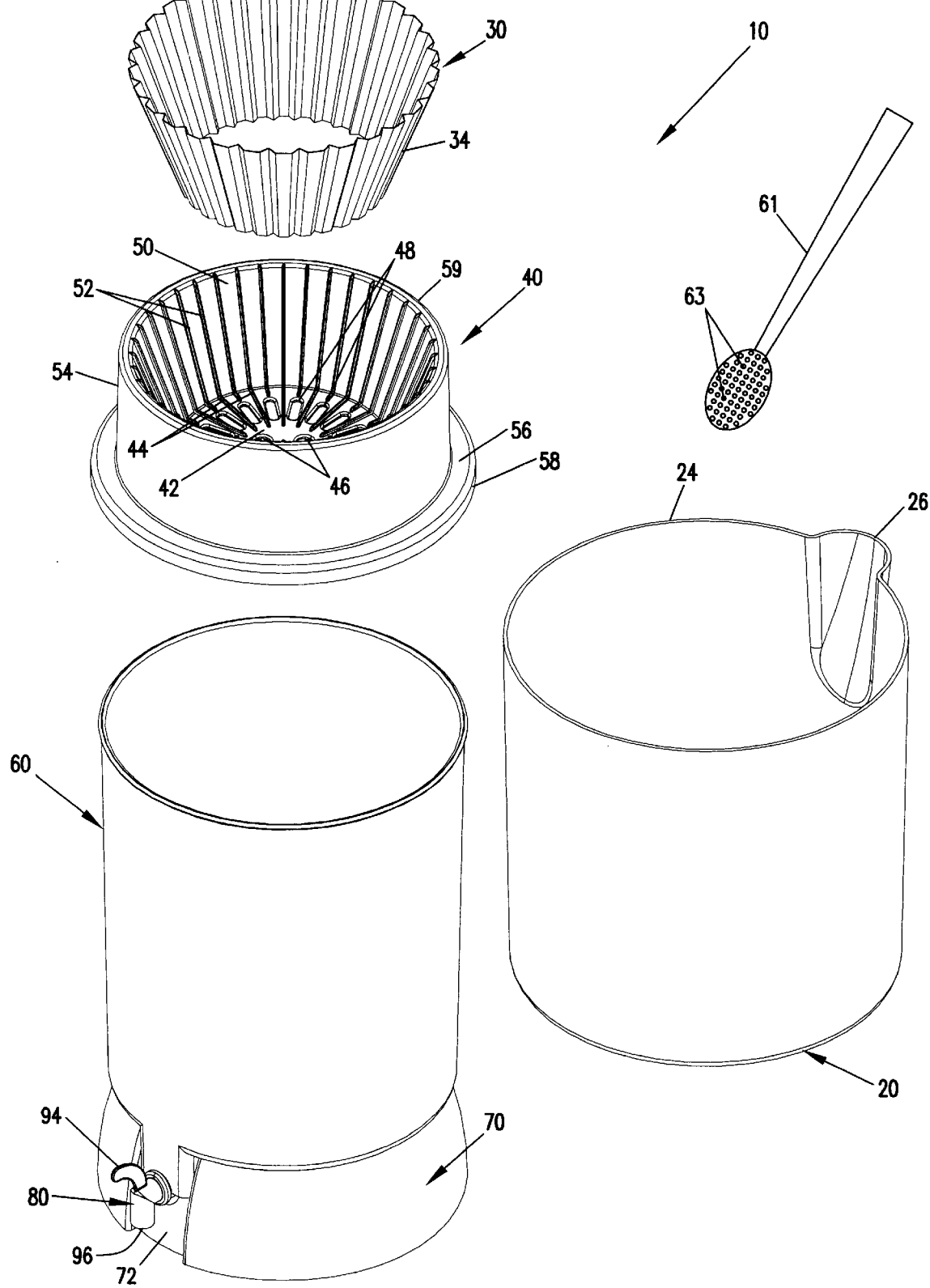
FIG. 1 is an exploded perspective view of a first embodiment of a water purification kit according to the present invention.

A first embodiment of a water purification kit will be described with reference to FIGS. 1–3. Referring in particular to FIG. 1, kit 10 includes first container 20, filter 30, filter holder 40 and second container 60, and a stirring implement 61.

First container 20 is for mixing a water treatment ("flocculent") composition. It is preferably 5–20 liters in volume, most preferably 12–14 liters so that a batch of approximately 10 liters can be made. Pour spout 26 is for pouring the partially purified water with flocs out of first container 20.

Figure 2:
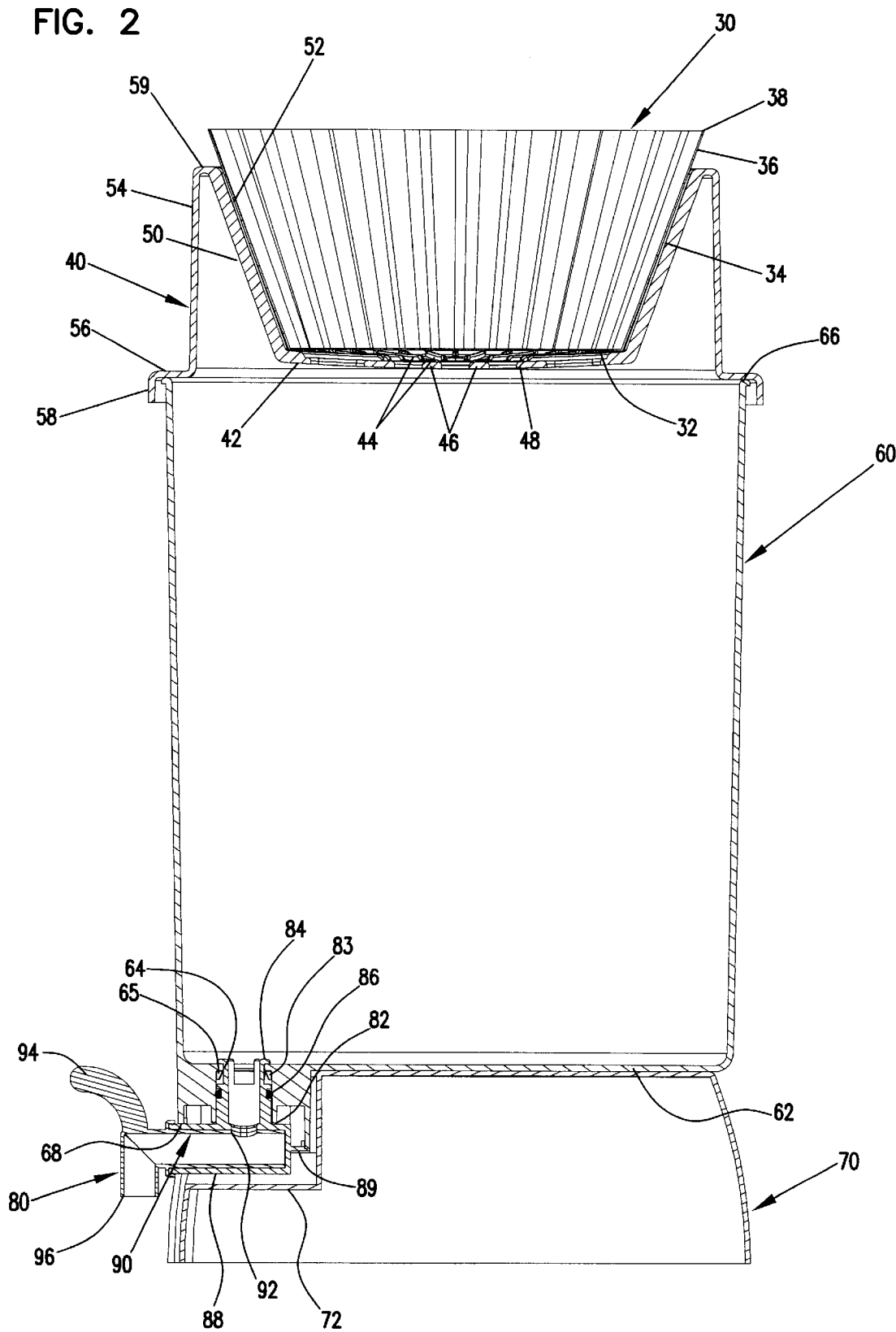
FIG. 2 is a vertical cross-sectional view of the first embodiment shown assembled without the first container.

Filter holder 40 is shown assembled onto second container 60 in FIG. 2. Filter holder 40 includes annular wall 56 which rests on upper edge 66 of second container 60. Annular wall 56 extends outwardly from upper edge 66 to prevent unfiltered water from entering second container 60. Downwardly extending lip 58 is also for this purpose. Outside wall 54 extends upwardly to top wall 59, which supports angled wall 50 and in turn bottom 42, both of which are for supporting filter 30.

With this filter holder configuration, the bottom 32 of filter is held above the upper edge 66 of second container 60. This is preferable so that more water can be poured into the second container and that the filter does not become immersed in the water in the second container.

Filter holder 40 supports filter 30 with holder bottom 42 beneath filter bottom 32, and angled support wall 50 holding filter sidewall 34 inwardly. Support wall 50 is preferably angled outwardly, more preferably between 30–60 degrees from vertical, and most preferably 45 degrees.

Filter holder 40 is configured to optimize flow rate through the filter while providing adequate filter support. The openings through which filtered water flows cannot be too large or numerous, as this can cause filter to push through and rupture. The openings shown in FIGS. 1 and 2 include five circular central openings 46 (1.0 cm in diameter), and twelve outside oval openings 48 (0.75 cm wide and 1.25 inches long) around central openings 46. However, the total area of all openings in filter holder is preferably much larger, between 50–80% of the holder surface area, most preferably about 75%. Openings could also be provided in angled support wall 50.

Filter holder 40 includes ribs 44, 52 which hold filter 30 away from holder bottom 42 and support wall 50, breaking the surface tension and thereby permitting water to flow between ribs 44, 52 to openings 46, 48. Bottom 42 is also curved downwardly to direct flow to openings 46, 48. In this way, a higher surface area of the filter is used and a higher flow rate can be obtained. Lifting the filter with the ribs away from the outlet openings also reduces the risk of filter rupture.

The volume of the filter is preferably 1.0–5.0 liters, most preferably about 2.0 liters. The surface area of the filter is preferably 100–300 in.$^2$, most preferably about 200 in.$^2$.

The flow rate through the filter and filter holder preferably is relatively high so that it does not take too long to pour the partially treated water from first container 20. A preferred flow rate is 0.5–20 liters per minute, and more preferably 5–10 liters per minute. These flow rates are preferably achieved after treatment of the water according to the preferred process described more fully hereafter. Because the size of the particulates of "flocs" can be a function of both the nature of the water purification composition as well as the manner in which it is used (e.g., the sequence, number, and nature of the stirring time intervals), the selection of the filter material and the design of the filter holder can affect the flow rate of the treated water through the filter 20 and the filter holder 40.

Filter 30 and filter holder 40 are also configured to reduce the possibility of unfiltered water bypassing the filter between the filter and holder. Filter 30 includes a top portion 36 that extends above top 59 of filter holder. If the filter is overfilled, its top edge 38 will bend over top wall 59 of holder, and the unfiltered water will flow outside of filter holder 40. Top edge 38 is also wider than the top of angled wall 50 to avoid bypass.

Second container 60 preferably has about the same volume as first container 20. Its volume is preferably 5–20 liters, and most preferably 12–14 liters.

Second container 60 can include a spigot 80 for dispensing purified water. The spigot arrangement of the first embodiment is unique because it permits easier and less expensive manufacturing. The most common way to attach a spigot in such a container is to drill a hole in the side and attach the spigot manually with a series of washers, nuts, etc. This is labor and part intensive. The preferred spigot 80 includes only three parts, valve body 82, valve 90 and O-ring 86. The O-ring perhaps can also be eliminated by replacing it with an interference fit. This assembly is simply snapped into valve cavity 65 in the bottom of the second container. Because valve cavity 65 is axially oriented, it can be formed in a "straight pull" molding process.

Spigot 80 is held to second container bottom 62 with flange 84, and O-ring 86 creates a seal between valve body 82 and valve body cavity 65. Valve body 82 includes a vertical upper portion 83 within cavity 65 and a horizontal lower portion 88 containing valve 90. Lower portion 88 is further held in place with locking tab 89 engaging an extension of container 60.

In operation, valve 90 is rotated to the open position (shown) in which flow opening 92 of valve 90 lines up with a corresponding opening in the bottom of upper portion 83 of valve body 82. Water flows from outlet opening 64 of container, through vertical portion 83 of valve body 82, into the interior of valve 90 and out spigot outlet 96.

Stand 70 is provided to accommodate the spigot arrangement (via recess 72) and to raise it above for example a table on which the assembly is placed.

Figure 3:
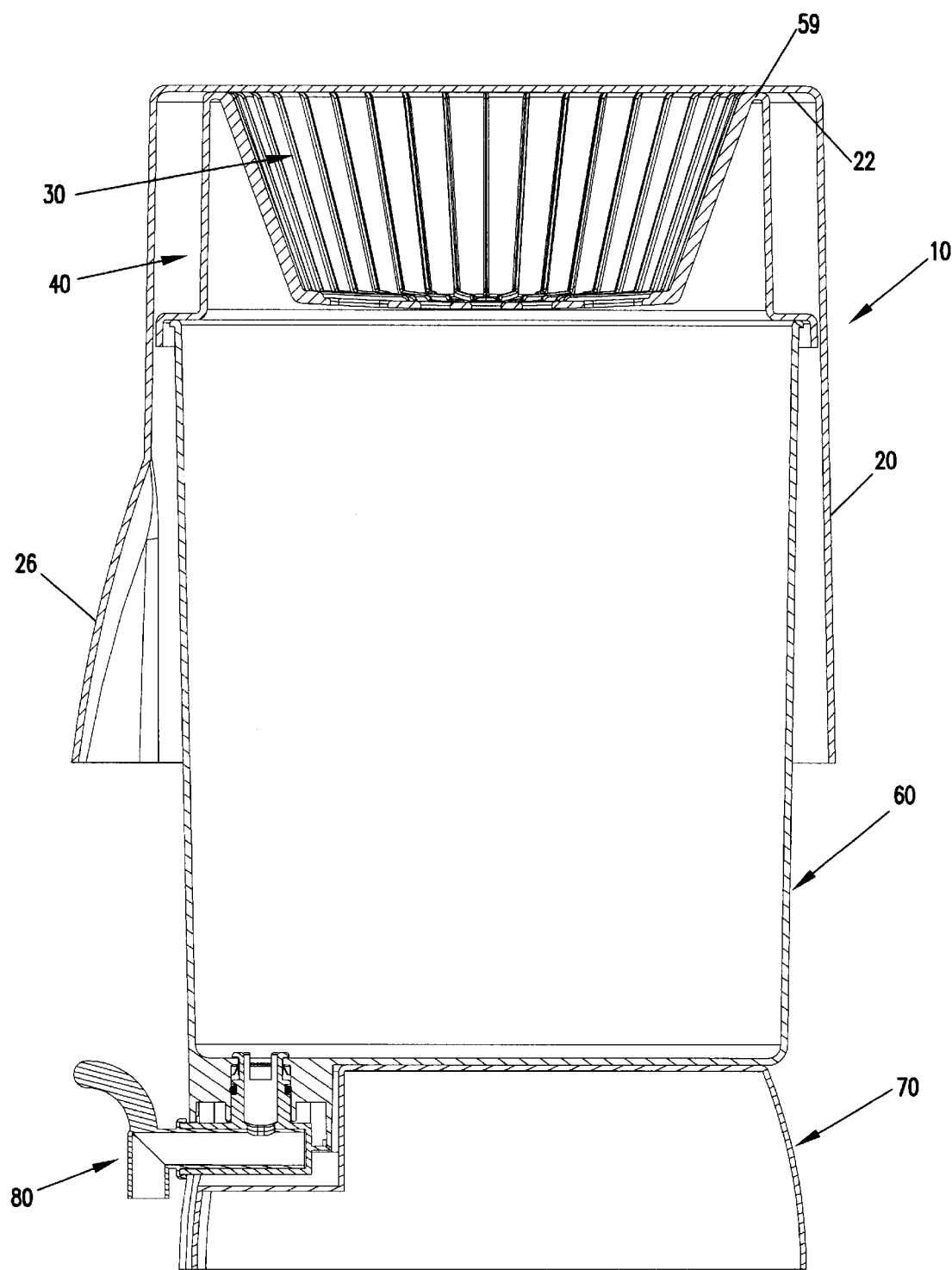
FIG. 3 is a vertical cross-sectional view of the first embodiment fully assembled.

Referring to FIG. 3, the components of kit 10 are configured so that they can be assembled or "nested" into a convenient unit. In particular, first container 20 fits over filter holder 40 and partially over second container 60, with container bottom 22 resting on top 59 of the filter holder. With this arrangement, container 20 also acts as a cover to prevent contamination of filter 30 or purified water in second container 60.

Second and Third Embodiments

Figure 4:
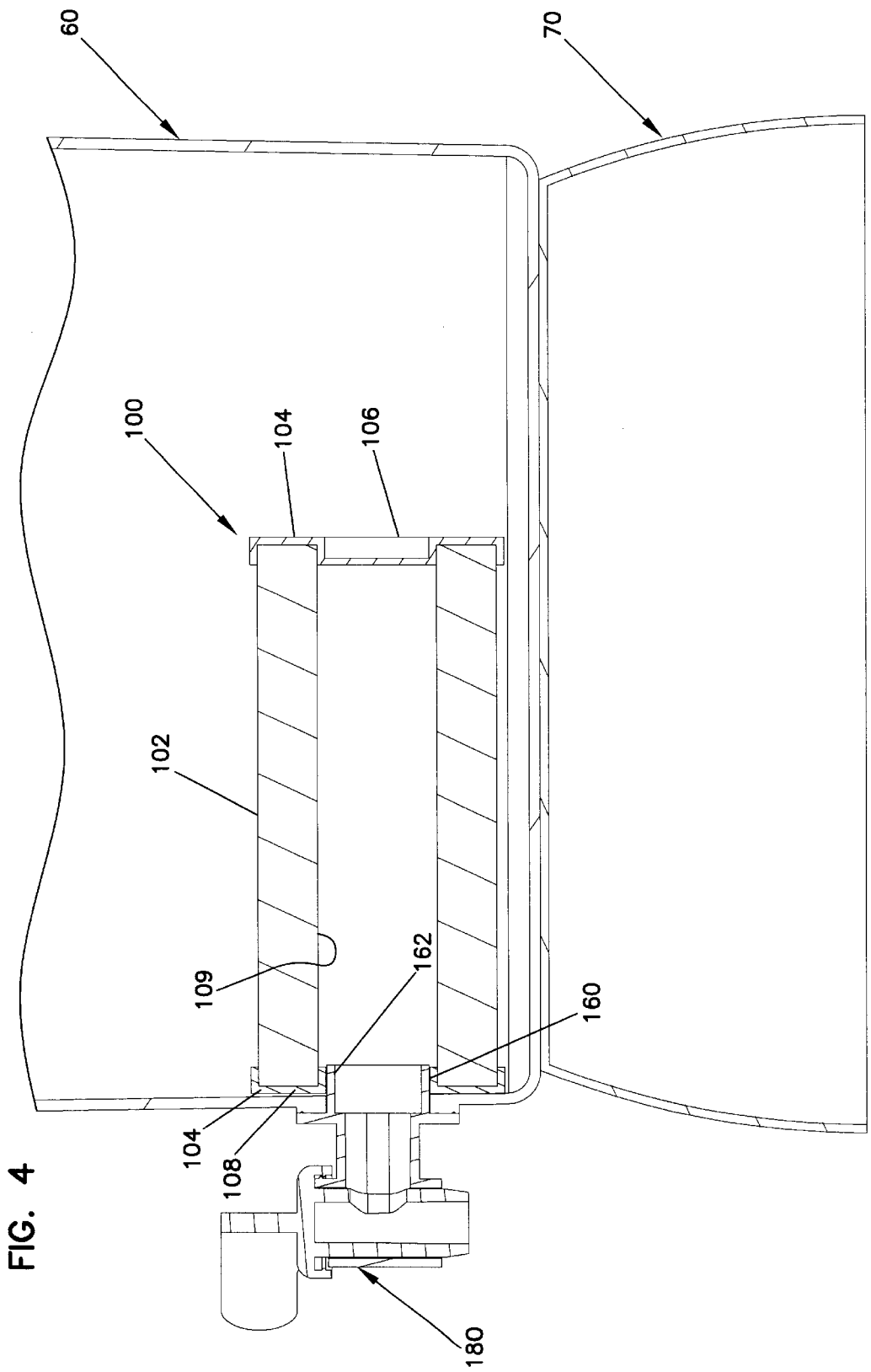
FIG. 4 is a vertical cross-sectional view of a second embodiment of a water purification kit according to the present invention.
Figure 5:
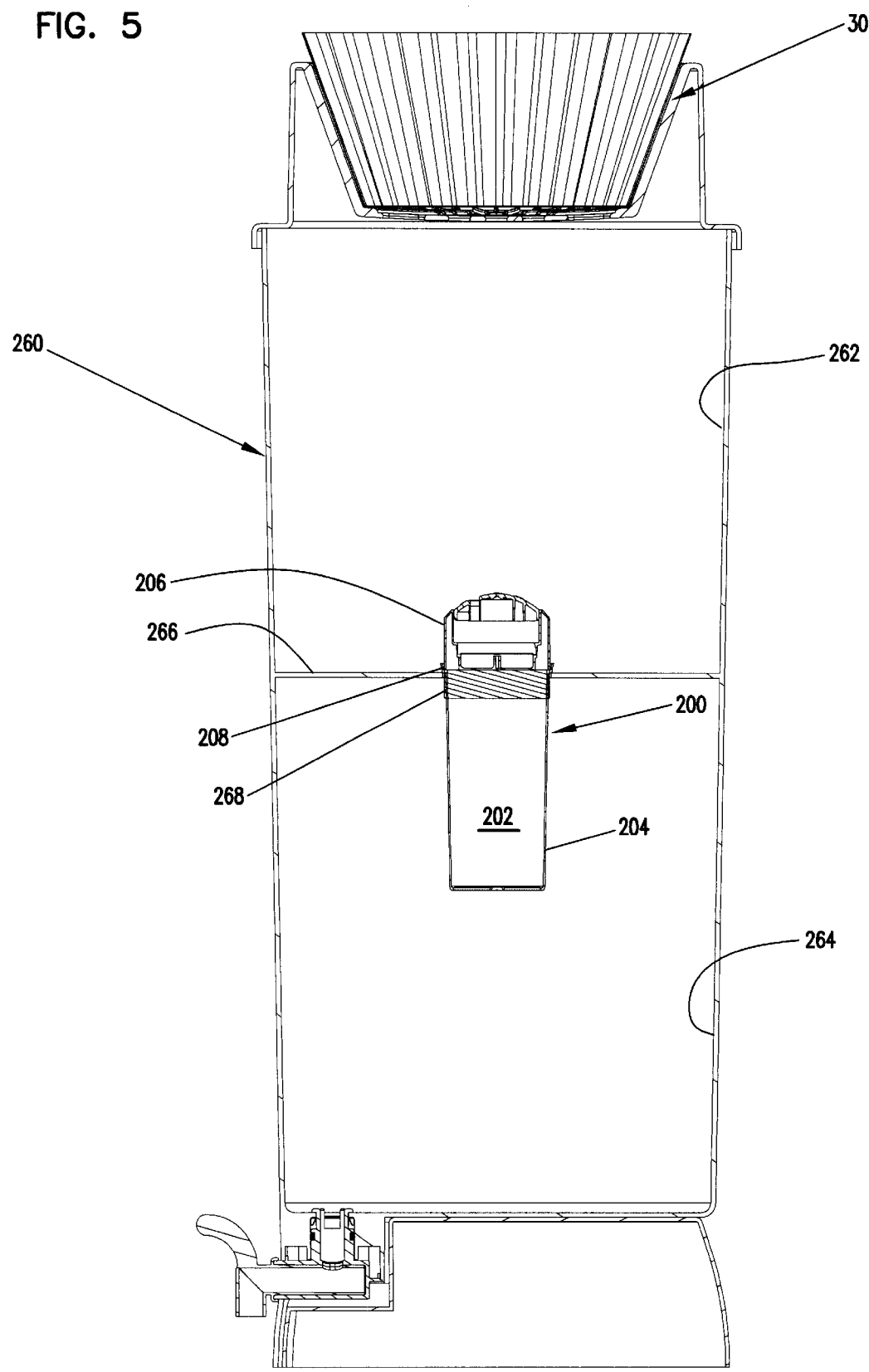
FIG. 5 is a vertical cross-sectional view of a third embodiment of a water purification kit according to the present invention.

Referring to FIGS. 4 and 5, the second and third embodiments incorporate into a kit a second filter 100, 200 positioned in second container 60. This second filter comprises carbon to remove undesirable components remaining in the purified water, such as chlorine and odors. Chlorine in particular is a typical product of the flocculation process that is preferably removed in order to improve taste.

The carbon filter locations and constructions shown are only two ways in which a carbon filter can be incorporated into a kit. For example, a carbon filter comprising an additional filter layer beneath the first filter in the filter holder could be employed. Various arrangements within the second container could also be employed.

Referring to the second embodiment in FIG. 4, a carbon filter arrangement is shown in which the filter 200 is located at an outlet 162 of second container 60. With this location, the water in second container 60 remains chlorinated until dispensed through spigot 80. This is preferable so that the chlorine can maintain the purified water organism free while it is stored in second container 60.

The filter 100 shown is a radial flow, cylindrical filter having a closed end 106 and an opened end 108. Water flows radially inwardly through media 102, into central core 109, though container outlet 160, and out the conventional spigot 180 shown. Media 102 is enclosed with end caps 104 and for example hot melt glue. Filter 100 is attached to outlet tube 160 through a bayonet connection and an O-ring (not shown). Axial or radial seal mechanisms can be employed, although an axial seal is presently contemplated. Media 102 can be bound fine mesh carbon (i.e., carbon block) or a sheet of carbon fiber mesh wrapped onto an internal cylinder.

The second filter can comprise a variety of other carbon filter and media constructions that attach to the outlet of the second container. For example, the filter could be an axial flow filter. One axial flow construction that could be employed is a cylindrical filter comprising coarse mesh carbon sandwiched between two porous disks.

One of the requirements of carbon filter 100 of the second embodiment is that it have a sufficiently high flow rate. This is because the filter operates "on demand"—it must filter water as fast as an acceptable flow rate from spigot 180. The preferred rate is 0.5–5.0 liters per minute, most preferably 1.0–3.0 liters per minute.

Referring to FIG. 5, another carbon filter arrangement in the second container is shown in a third embodiment. Second container 260 comprises upper 262 and lower 264 chambers. Upper chamber 262 is preferably 5–20 liters in volume, most preferably 12–14 liters; lower chamber 264 is preferably 5–20 liters, most preferably 12–14 liters.

Carbon filter 200 is held by wall 266 separating chambers 262, 264. It is sealed with sealing lip 208 around its periphery against the inner side of sleeve 268 extending downwardly from wall 266. The filter could also be sealed for example using an O-ring.

After water has passed through first filter 30, it flows into upper chamber 262. From there it flows into second filter 200 through openings in upper housing 206, then through media 202 in lower housing 204, and out through openings in the bottom of lower housing 204. The water, now in lower chamber 264, is then stored and dispensed as with the first embodiment.

Media 202 in carbon filter 200 is preferably loose granular activated carbon. Other granular media that could be added include ion exchange resin or zeolites. Silver could also be added, for example through silverized carbon, to prevent organisms from growing in the unchlorinated water while stored.

In addition to the carbon media described above with respect to the second and third embodiments, other forms of carbon could also be employed within the principles of the invention. Non-carbon media in addition to those described above could also be added in various forms.

Water Purification Composition

A variety of flocculent compositions are known and could be used within the principles of the invention. Examples are described in U.S. Pat. Nos. 5,023,012 and 5,681,475. These compositions typically include a coagulant and an organic hydrophilic colloid, as well as a source of alkalinity, a disinfectant, a secondary colloid, and clay and/or aluminosilicate (which act as seed particles for floc formation).

Certain preferred compositions are described in British Patent Application Nos. 0015571.3 and 0015569.7, both filed Jun. 27, 2000, and in British Patent Application No. 0027214.6, filed on Nov. 8, 2000, each of which are incorporated by reference.

A first preferred composition comprises: (i) a first polymeric material which comprises an amine group; and (ii) a second polymeric material which is substantially water-soluble and has a weight average molecular weight of at least 2,000,000; and optionally (iii) an inorganic metal salt selected from the group consisting of iron sulfate, iron chloride, aluminum chloride, aluminum sulfate, manganese sulfate, manganese chloride, copper sulfate, copper chloride, poly-variations thereof or a combination thereof. The first polymeric material most preferably comprises chitosan, which is derived from the chitin of crustacea such as crabs, lobsters and shrimp. The preferred second polymeric material is polyacrylamide, and especially preferred are anionic or nonionic polyacrylamides. Typical anionic and nonionic polyacrylamides for use herein are those from the Magnafloc range supplied by Ciba. Of these polyacrylamides, especially preferred are those known under the trade name as Magnafloc LT20, Magnafloc LT25, Magnafloc LT25S, Magnafloc LT26, Magnafloc LT28, Magnafloc 351 and Magnafloc 919.

A second preferred composition comprises: (i) a polysaccharide which comprises an amine group; and (ii) a second polymeric material which is substantially water-soluble and has a weight average molecular weight of at least 100,000; and optionally (iii) an inorganic metal salt as described above. The preferred polysaccharide comprises chitosan. The preferred second polymeric material may comprise a cationic polyacrylamide. Preferred cationic polyacrylamides for use herein include those known under the trade names as Zetag 89, Praestol 611BC, Calfloc 1552, Calfloc 1506, Calfloc 1508, Magnafloc LT22, Magnafloc LT22S, Magnafloc LT27 and Polymin KP97.

A third preferred composition comprises: (i) a primary coagulant selected from the group consisting of water-soluble, multivalent inorganic salts and mixtures thereof; (ii) a bridging flocculant selected from the group consisting of water-soluble and water-dispersible anionic and nonionic polymers having a weight average molecular weight of at least about 2,000,000, and mixtures thereof; (iii) a coagulant aid selected from the group consisting of water-soluble and water-dispersible cationic polymers having a weight average molecular weight of less than about 1,500,000, and mixtures thereof; and optionally one or more of (iv) a microbiocidal disinfectant; (v) a water-soluble alkali; (vi) a water-insoluble silicate selected from clays, zeolites and mixtures thereof; and (vii) a food additive or nutrient source.

The composition is preferably in a solid form, most preferably in a tablet or powder form. The composition is preferably packaged in a water impermeable material, such as polypropylene or typical laminates, so that it is protected from environmental conditions such as moisture. An example of one such laminate is a laminate supplied by Akerlund & Raus, comprising layers of coated paper (outer), LDPE, aluminium foil and an inner layer Surlyn (an ethylene/methacrylate co-polymer)—an FDA approved food packaging.

The kits of the present invention can further include one or more unit or dosage forms (e.g., tablets, sachets, pouches, etc.) of the water purification composition, wherein each unit dosage form is sufficient to treat a volume of water equivalent to the previously described volumes for the first container 20 and/or the second container 60. The kit 10 can include between about 1 and about 28 unit dosage forms of the water purification composition. More preferably, the kit 10 includes between about 7 and about 13 unit dosage forms of the water purification composition. Each unit dosage form of the water purification composition can contain between about 3 gms and about 10 gms of the water purification composition. More preferably, each unit dosage form of the water purification composition contains between about 5 gms and about 8 gms of the water purification composition.

First Filter Composition and Construction

The first filter of the invention could comprise a variety of materials, including but not limited to cloth, paper, glass fiber, activated carbon, zeolite, and ion exchange media. The filter can include multiple layers. It can be disposable or cleanable. It is preferably hydrophilic to maximize flow.

The filter is comprised of a plurality of pores, each pore having an effective pore size sufficiently small for reduction of turbidity and for separating small flocs, and sufficiently large for resisting clogging. The pore radius can be 2–250 microns depending on the construction. Certain paper towel products have a unique structure that allows them to provide a nearly uniform distribution of pore sizes below about 200 μm. While it is expected that small pores will provide good capture of insoluble material, and larger pores will improve flow performance, we have unexpectedly found that a nearly uniform, relatively high concentration of pore sizes from about 10 $\mu$m to 100 $\mu$m and a still larger concentration peak between 100 $\mu$m and 200 $\mu$m delivers excellent flow and filtering performance with the disclosed water purification composition. For example, a pore volume of greater than 0.004 cm$^3$/g/$\mu$m, for pore sizes between 10 $\mu$m and 150 $\mu$m, may be preferred. A pore volume greater than 0.010 cm$^3$/g/$\mu$m, more preferably greater than 0.050 cm$^3$/g/$\mu$m, for the largest concentration of pores having a pore radius of between 100 to 200 $\mu$m, may be further preferred. These pore sizes and volumes were determined using the method described below. It is believed that the specific pore sizes are found in specific regions of the laminated paper structure. This helps support a sustainable balance of flow versus insoluble material removal via size classification and settling. More typical filter media have a high concentration of pores only below about 50 $\mu$m. These pores are easily filled by insoluble material, and flow rates then decrease dramatically.

The filter may be woven or non-woven. It may be comprised of synthetic material (such as but not limited to polyester, polypropylene, polyethylene, rayon, combinations thereof, and the like), natural material (such as but not limited to cotton, wood, bagasse, kenaf, recycle fiber, combinations thereof, and the like). The filter may be cellulosic, non-cellulosic, or a combination thereof.

A filter suitable for use with the present invention will have a basis weight of at least about 20 g/m$^2$, preferably of at least about 40 g/m$^2$, and more preferably at least about 80 g/m$^2$.

The filter needs to have sufficient strength in both the wet and dry states to maintain its integrity in use. The filter has a wet burst strength of at least about 300 grams, preferably at least about 350 grams, and most preferably at least about 450 grams.

A suitable filter useful with the present invention will provide a filtrate having a turbidity of no more than about 2.5 NTU and a flow rate through the filter of at least about 0.10 liters/minute, and more preferably of at least about 0.50 liters/minute. The turbidity can be measured using a turbidimeter, as is known in the art. An exemplary turbidimeter suitable for use herein is Orbeco Hellige Model 966.

One preferred filter comprises a cloth. A preferred cloth is comprised of 100% white cotton flannel. The nap of the flannel preferentially traps the fine floc in the top layer of water that is filtered through it. A suitable single sided napped flannel sloth for this purpose is White Cozy Flannel SKU #1271568 available from Jo-Ann Fabrics of Cincinnati, Ohio. A more preferred flannel sloth is a two-sided napped flannel. The two-sided napped flannel is preferred because the orientation for filtering is moot. A suitable two-sided napped flannel sloth is SKU #63002 Flanela Blanca, Tenid available from Cantel, S.A. of Guatemala City, Guatemala.

Another preferred filter comprises a cellulosic paper substrate such as that commonly used in BOUNTY® brand paper towels marketed by The Procter & Gamble Company of Cincinnati, Ohio.

The cellulosic paper substrate can be of a homogenous or multi-layered construction; and the filter made therefrom can be of a single ply or preferably a multiply construction.

The cellulosic paper substrate is typically made by depositing a papermaking furnish on a foraminous forming fabric or wire. Once the furnish is deposited on the forming wire, it is referred to as a web. The web is typically dewatered to a fiber consistency of between about 7% and about 25% (total web weight basis) by vacuum dewatering.

The web may then be conventionally pressed to further dewater the web, using one or more press felts or the web may be further dewatered by through air drying. If the web is conventionally pressed, it may be conventionally pressed using a felt which applies a pattern to the paper as taught by U.S. Pat. No. 5,556,509 issued Sep. 17, 1996 to Trokhan et al. and U.S. Pat. No. 5,837,103 issued Nov. 17, 1998 to Trokhan et al., the disclosures of which are incorporated herein by reference.

The web may also be through air dried. A suitable through air dried substrate may be made according to commonly assigned U.S. Pat. No. 4,191,609, the disclosure of which is incorporated herein by reference.

The dewatered web may then be further pressed and dried by a steam drum apparatus known in the art as a Yankee dryer. Pressure can be developed at the Yankee dryer by mechanical means such as an opposing cylindrical drum pressing against the web. Multiple Yankee dryer drums can be employed, whereby additional pressing is optionally incurred between the drums. The tissue paper structures that are formed are referred to hereafter as conventional, pressed, tissue paper structures. Such sheets are considered to be compacted since the entire web is subjected to substantial mechanical compressional forces while the fibers are moist and are then dried while in a compressed state.

Preferably, the substrate which comprises the paper according to the present invention is through air dried on a belt having a patterned framework. The belt according to the present invention may be made according to U.S. Pat. No. 4,637,859 issued Jan. 20, 1987 to Trokhan; U.S. Pat. No. 4,514,345 issued Apr. 30, 1985 to Johnson et al.; U.S. Pat. No. 5,328,565 issued Jul. 12, 1994 to Rasch et al.; and U.S. Pat. No. 5,334,289 issued Aug. 2, 1994 to Trokhan et al., the disclosures of which are incorporated herein by reference.

Alternatively, the papermaking furnish can be initially deposited on a foraminous supporting carrier that also operates as an imprinting fabric.

The patterned framework of the belt preferentially imprints a pattern comprising an essentially continuous network onto the paper and further has deflection conduits dispersed within the pattern. The deflection conduits extend between opposed first and second surfaces of the framework. The deflection conduits allow domes to form in the paper.

The through air dried paper made according to the foregoing patents has a plurality of domes formed during the papermaking process which are dispersed throughout an essentially continuous network region. The domes extend generally perpendicular to the paper and increase its caliper. The domes generally correspond in geometry, and during papermaking in position, to the deflection conduits of the belt described above.

There are an infinite variety of possible geometries, shapes, and arrangements for the deflection conduits and the domes formed in the paper therefrom. These shapes include those disclosed in U.S. Pat. No. 5,275,700 issued on Jan. 4, 1994 to Trokhan. Examples of these shapes include but are not limited to those described as the linear Idaho pattern, Bow-tie pattern, and Snowflake pattern.

The domes protrude outwardly from the essentially continuous network of the paper due to molding into the deflection conduits during the papermaking process. By molding into the deflection conduits during the papermaking process, the regions of the paper comprising the domes are deflected in the Z-direction.

The paper according to the present invention having domes may also be made according to commonly assigned U.S. Pat. No. 4,528,239 issued Jul. 9, 1985 to Trokhan; U.S.

Pat. No. 4,529,480 issued Jul. 16, 1985 to Trokhan; U.S. Pat. No. 5,245,025 issued Sep. 14, 1993 to Trokhan et al.; U.S. Pat. No. 5,275,700 issued Jan. 4, 1994 to Trokhan; U.S. Pat. No. 5,364,504 issued Nov. 15, 1985 to Smurkoski et al.; U.S. Pat. No. 5,527,428 issued Jun. 18, 1996 to Trokhan et al.; U.S. Pat. No. 5,609,725 issued Mar. 11, 1997 to Van Phan; U.S. Pat. No. 5,679,222 issued Oct. 21, 1997 to Rasch et al.; U.S. Pat. No. 5,709,775 issued Jan. 20, 1995 to Trokhan et al; U.S. Pat. No. 5,776,312 issued Jul. 7, 1998 to Trokhan et al.; U.S. Pat. No. 5,795,440 issued Aug. 18, 1998 to Ampulski et al.; U.S. Pat. No. 5,900,122 issued May 4, 1999 to Huston; U.S. Pat. No. 5,906,710 issued May 25, 1999 to Trokhan; U.S. Pat. No. 5,935,381 issued Aug. 10, 1999 to Trokhan et al.; and U.S. Pat. No. 5,938,893 issued Aug. 17, 1999 to Trokhan et al., and U.S. Ser. No. 09/694,946 filed Oct. 24, 2000, in the name of Cabell et al., the disclosures of which are incorporated herein by reference.

Several variations in the substrate used for the paper according to the present invention are feasible and may, depending upon the application, be desirable. The substrate which comprises the paper according to the present invention may be optionally foreshortened. The optional foreshortening may be accomplished by creping or by wet microcontration. Creping and wet microcontration are disclosed in commonly assigned U.S. Pat. No. 4,191,756 issued to Sawdai on May 4, 1980 and U.S. Pat. No. 4,440,597 issued to Wells et al. on Apr. 3, 1984, the disclosures of which are incorporated by reference.

The paper according to the present invention may be layered. Layering is disclosed in commonly assigned U.S. Pat. No. 3,994,771 issued Nov. 30, 1976, to Morgan et al.; U.S. Pat. No. 4,225,382 issued Sep. 30, 1980, to Kearney et al.; and U.S. Pat. No. 4,300,981 issued Nov. 17, 1981, to Carstens, the disclosures of which patents are incorporated herein by reference.

Figure 6A:
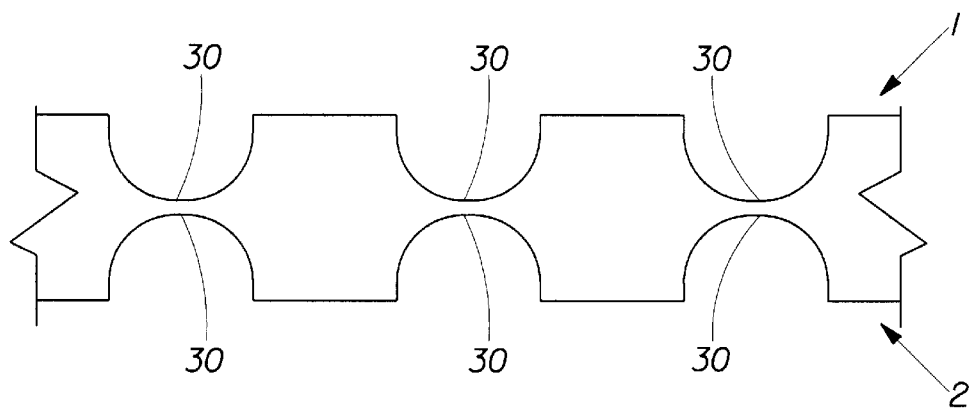
FIGS. 6A–D depict multiple-ply face-to-face arrangements for a preferred embodiment of the first filter.
Figure 6B:
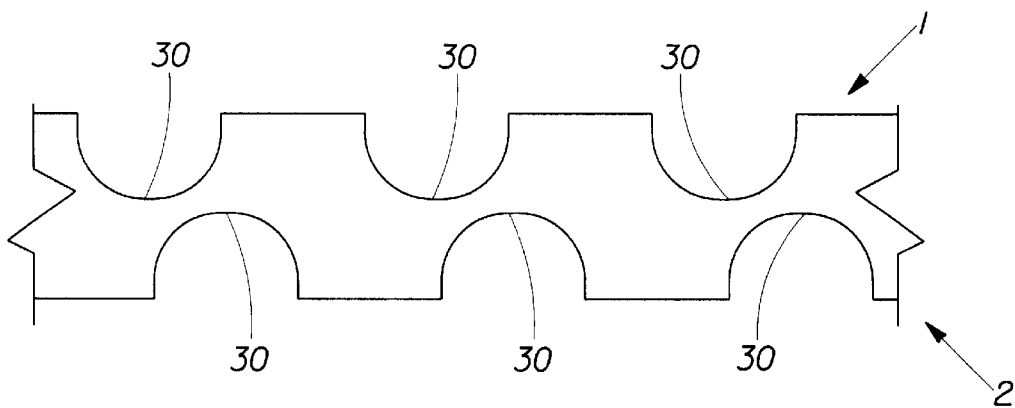
Figure 6C:
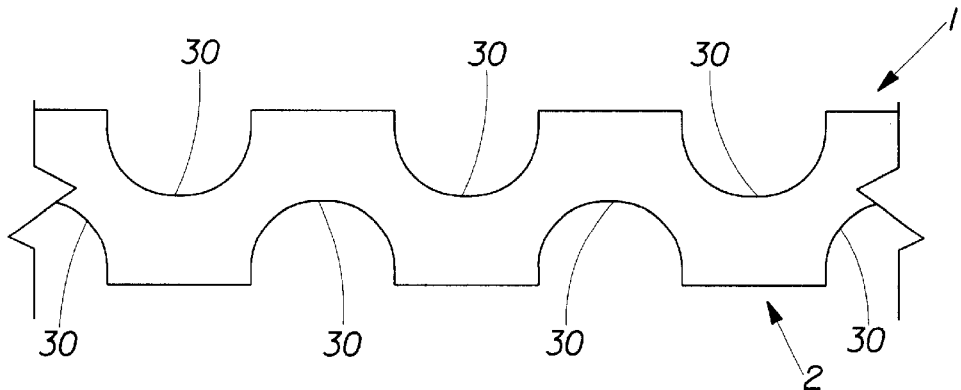
Figure 6D:
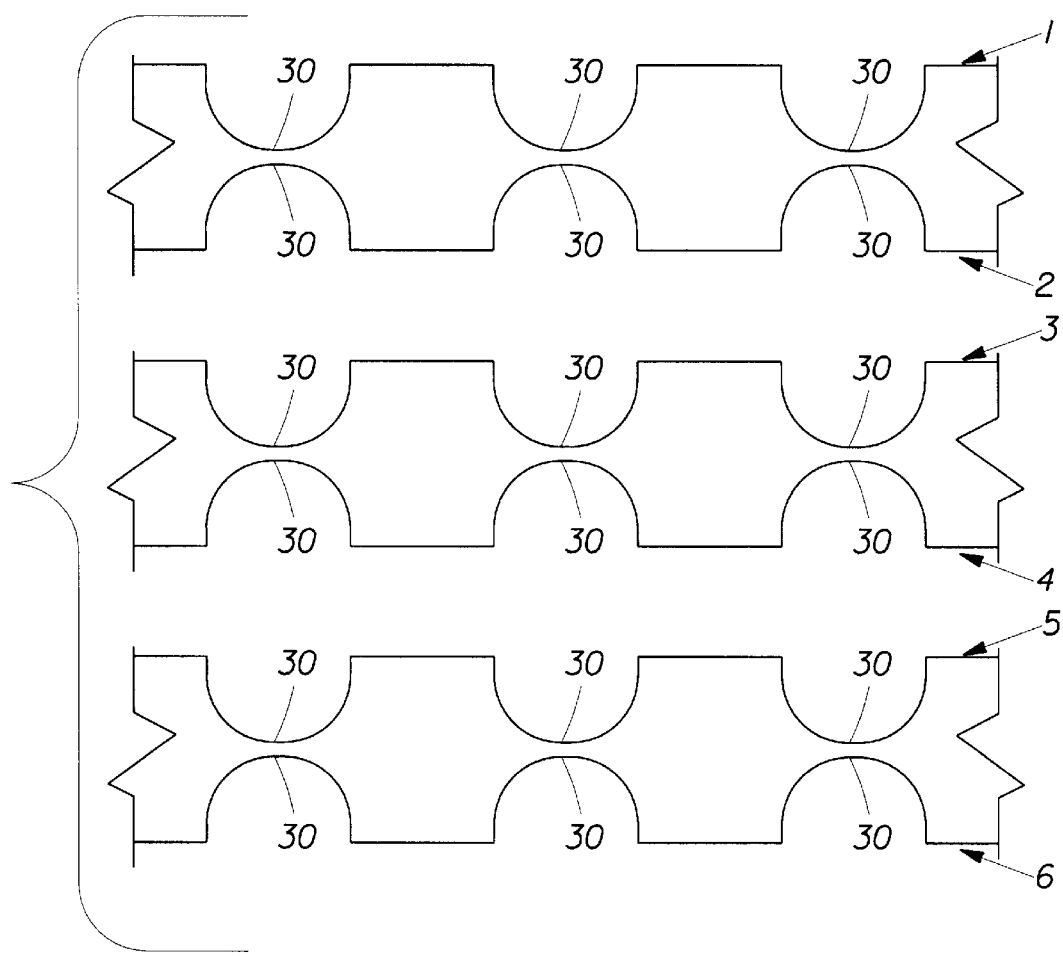

Referring to FIGS. 6A–D, two or more plies may be joined together in a face to face arrangement. Each ply may be oriented with the adjacent ply in numerous different configurations. For example, in a two-ply structure 40, the domes 30 of the first ply 1 may be aligned in a dome-to-dome pattern with the domes 30 of the second ply 2 as shown in FIG. 6A. Alternatively, in a two-ply structure 40, the domes 30 of the first 1 ply may be joined in an off-set dome-to-dome pattern with the domes 30 of the second ply 2 as shown in FIG. 6B. In another alternative two-ply embodiment, the domes 30 of the first ply 1 may be joined in a nested pattern with the domes of the second ply 2 as shown in FIG. 6C. FIG. 6D shows an example of a multi-ply structure 50 wherein the domes of the first ply 1 and the domes of the second ply 2 are oriented in a dome-to-dome pattern. The domes of the third ply 3 are oriented in a dome-to-dome pattern with the domes of the fourth ply 4. The domes of the fifth ply 5 are oriented in a dome-to-dome pattern with the domes of the sixth ply 6. The examples provided herein are not to be construed as limiting to the scope of the invention.

The substrate may be embossed and/or laminated. Suitable means of embossing include those disclosed in U.S. Pat. No. 3,323,983 issued to Palmer on Sep. 8, 1964; U.S. Pat. No. 5,468,323 issued to McNeil on Nov. 21, 1995; U.S. Pat. No. 5,693,406 issued to Wegele et al. on Dec. 2, 1997; U.S. Pat. No. 5,972,466 issued to Trokhan on Oct. 26, 1999; U.S. Pat. No. 6,030,690 issued to McNeil et al. on Feb. 29, 2000; and U.S. Pat. No. 6,086,715 issued to McNeil on Jul. 11, 2000, and U.S. Ser. No. 09/677,654 filed on Oct. 3, 2000, the disclosures of which are incorporated herein by reference.

Suitable means of laminating the plies include but are not limited to those methods disclosed in U.S. Pat. No. 6,113,723 issued to McNeil et al. on Sep. 5, 2000; U.S. Pat. No. 6,086,715 issued to McNeil on Jul. 11, 2000; U.S. Pat. No. 5,972,466 issued to Trokhan on Oct. 26, 1999; U.S. Pat. No. 5,858,554 issued to Neal et al. on Jan. 12, 1999; U.S. Pat. No. 5,693,406 issued to Wegele et al. on Dec. 2, 1997; U.S. Pat. No. 5,468,323 issued to McNeil on Nov. 21, 1995; and U.S. Pat. No. 5,294,475 issued to McNeil on Mar. 15, 1994, the disclosures of which are incorporated herein by reference.

The substrate may also be made according to U.S. Pat. No. 5,411,636 issued to Hermans et al. on May 2, 1995 and EP 677612 published in the name of Wendt et al. on Oct. 18, 1995.

In addition to papermaking fibers, the papermaking furnish used to make the filter can have other components or materials added thereto. The types of additives that are utilized will be dependent upon the particular desired attributes of the filter. For example, it is desirable that the filter of the present invention have wet strength. Chemical substances known in the art as "wet strength" agents are added to the papermaking furnish for this purpose.

Useful wet strength agents include those that are generally cationic in character. Examples of wet strength agents suitable for use with the present invention include cationic polyamide-epichlorohydrin resins such as those described in U.S. Pat. No. 3,700,623, issued to Keim on Oct. 24, 1972, and U.S. Pat. No. 3,772,076, issued to Keim, on Nov. 13, 1973, both of which are incorporated by reference.

A useful cationic polyamide-epichlorohydrin wet strength agent suitable for use with the present invention is KYMENE® 557H, commercially available from Hercules, Inc. of Wilmington, Del.

Other suitable wet strength agents include latex based wet strength agents and polyacrylamide resins such as those described in U.S. Pat. No. 3,556,932, issued to Coscia et al. on Jan. 19, 1971, and U.S. Pat. No. 3,556,933, issued to Williams et al. on Jan. 19, 1971, both of which are incorporated herein by reference. One commercial source of polyacrylamide resin is American Cyanamid Co. of Stamford, Conn., which markets one such resin under the name of PAREZ® 631 NC.

Other water-soluble cationic resins which may be used in this invention include urea formaldehyde and melamine formaldehyde resins. The more common functional groups of these polyfunctional resins are nitrogen containing groups such as amino groups and methylol groups attached to nitrogen. Polyethylenimine type resins may also be used in the present invention.

The wet strength agent is applied in an amount from about 0.05% to 10% by weight of the filter, preferably from about 0.1% to 5% by weight of the filter, and more preferably from about 0.2% to 2% by weight of the filter.

In addition to a wet strength agent, a dry strength agent may also be added to the papermaking fibers comprising the filter. A non-limiting example of a suitable dry strength agent is carboxymethyl cellulose. If used, the dry strength agent is applied in an amount from about 0.001% to 3.0% by weight of the filter, preferably from about 0.01% to 0.50% by weight of the filter, and more preferably from about 0.10% to 0.030% by weight of the filter.

Other components could be added to the filter, including carbon and silver. For example, fine mesh carbon such as 200 U.S. mesh (0.0029 inches), could be layered between layers of filter media. Carbon could also be a component of the paper substrate. Silver could be added to prevent organisms from growing in the unchlorinated water, for example through silverized carbon.

Referring to filter 30 shown in FIGS. 1 and 2, sidewall 34 may be corrugated or pleated. This is for the purpose of increasing flow rate by creating channels between sidewall 34 and filter holder 40. A discontinuous side wall also helps hold the filter in the filter holder.

EXAMPLE

The following is an example of how to make a preferred filter of the present invention. The filter is made from plies of cellulosic fibers as are commonly used in BOUNTY® brand paper towels marketed by The Procter & Gamble Company of Cincinnati, Ohio. Each ply is made of about 65 percent northern softwood kraft pulp fiber and about 35 percent CTMP pulp fiber. Each ply has a basis weight of approximately 2.7 grams/m². Approximately 5–12.5 kg/ton of a wet strength agent and approximately 1–7.5 kg/ton of a dry strength agent are added to each ply.

Each ply is embossed in a nested embossing process by elliptically shaped embossments. The embossments are spaced in a complementary concentric diamond pattern on a 45 degree pitch of about 0.118 inches (0.30 cm). Two complementary plies are made and adhesively joined together at a zero clearance marrying nip, so that a unitary laminate having about 346 embossments per square inch (5.6 embossments per cm²) per ply is formed.

In order to form the filter, three unitary laminate sheets are bonded together with an adhesive. A suitable adhesive for this purpose is a hot melt glue available as HL-1262 ZP supplied by H. B. Fuller Company of Paducah, Ky.

First Filter Pore Volume Distribution Methodology

Pore Volume Distribution measurements are made on a TRI/Autoporosimeter (TRI/Princeton Inc. of Princeton, N.J.). The TRI/Autoporosimeter is an automated computer-controlled instrument for measuring pore volume distributions in porous materials (i.e. the volumes of different size pores within the range from 1 to 1000 $\mu$m). Complimentary Automated Instument Software, Release 2000.1, and Data Treatment Software, Release 2000.1 were used to capture, analyze and output the data. More information on the TRI/Auroposimeter, its operation and data treatments can be found in The Journal of Colloid and Interface Science 162 (1994), pgs 163–170, incorporated here by reference.

As used in this application, porosimetry involves recording the increment of liquid that enters or leaves a porous material as the surrounding air pressure changes. A sample in the test chamber is exposed to precisely controlled changes in air pressure. The size (radius) of the largest pore able to hold liquid is a function of the air pressure. As the air pressure increases (decreases), different size pore groups drain (absorb) liquid. The pore volume of each group is equal to this amount of liquid, as measured by the instrument at the corresponding pressure. The effective radius of a pore is related to the pressure differential by the following relationship.

Pressure differential=$[(2)\gamma \cos \Theta]$/effective radius where $\gamma$=liquid surface tension, $\Theta$=contact angle Typically pores are thought of in terms such as voids, holes or conduits in a material. For filters, these pores both exclude certain size particles and allow other fluids to pass through the material. It is important to note that this method uses the above equation to calculate effective pore radii based on the constants and equipment controlled pressures. The above equation assumes uniform cylindrical pores. Usually, the pores in natural and manufactured porous materials are not perfectly cylindrical, nor all uniform. Therefore, the effective radii reported here may not equate exactly to measurements of void dimensions obtained by other methods such as microscopy. However, these measurements do provide an accepted means to characterize relative differences in void structure between materials.

The equipment operates by changing the test chamber air pressure in user-specified increments, either by decreasing pressure (increasing pore size) to absorb liquid, or increasing pressure (decreasing pore size) to drain liquid. The liquid volume absorbed (drained) at each pressure increment is the cumulative volume for the group of all pores between the preceding pressure setting and the current setting.

In this application of the TRI/Autoporosimeter, the liquid is a 0.2 weight % solution of octylphenoxy polyethoxy ethanol (Triton X-100 from Union Carbide Chemical and Plastics Co. of Danbury, Conn.) in distilled water. The instrument calculation constants are as follows: $\rho$ (density)=1 g/cm3; $\gamma$ (surface tension)=31 dynes/cm2; cos $\Theta$=1°. A 0.22 $\mu$m Millipore Glass Filter (Millipore Corporation of Bedford, Mass.; Catalog # GSWP09025) is employed on the test chamber's porous plate. A plexglass plate weighing about 24 g (supplied with the instrument) is placed on the sample to ensure the sample rests flat on the Millipore Filter. No additional weight is placed on the sample.

The remaining user specified inputs are described below. The sequence of pore sizes (pressures) for this application is as follows (effective pore radius in $\mu$m): 2.5, 5, 10, 15, 20, 25, 30, 40, 50, 60, 70, 80, 90, 100, 125, 150, 175, 200, 250, 300, 400, 500, 600, 500, 400, 300, 250, 200, 175, 150, 125, 100, 90, 80, 70, 60, 50, 40, 30, 25, 20, 15, 10, 5, 2.5. This sequence starts with the sample dry, saturates it as the pore settings increase, and then subsequently drains the sample of all volume above an effective pore radius of 2.5 $\mu$m. The equilibrium rate was set at 5 mg/minute. No stop radius was specified.

In addition to the test materials, a blank condition (no sample between plexiglass plate and Millipore Filter) was run to account for any surface and/or edge effects within the chamber. Any pore volume measured for this blank run is subtracted from the applicable pore grouping of the test sample. This data treatment can be accomplished manually or with the available TRI/Autoporosimeter Data Treatment Software, Release 2000.1.

The characteristic pore size distribution of the draining sample (decreasing pore size settings) was analyzed, since flow within and through the filter media for this application is most pertinent with a fully saturated material. The TRI/Autoporosimeter reports the weight (mg) of liquid drained from each pore group. From this data and the weight of the original, dry sample, the ratio of pore volume/sample weight can be calculated. This value can be reported as mm³/mg or cm³/g. The pore distribution can be interpreted by dividing the cm³/g volume for each pore group by the range of effective pore radii over which that volume was measured. Results can be reported as cm³/g/$\mu$m or mm³/g/$\mu$m. These data treatments may be conducted manually based on the output of the Automated Instument Software, Release 2000.1, or one may use the Data Treatment Software, Release 2000.1 available from TRI/Princeton.

Method of Use

The kits described herein can be used to purify water using a method comprising: (a) contacting a water treatment composition with water to obtain partially purified water comprising solid matter; (b) alternating mixing and waiting periods; (c) filtering the solid matter to produce purified water; and optionally (d) passing the purified water through a carbon filter. Additional optional steps include: (e) storing the purified water in a dispenser; and (f) dispensing the purified water from the dispenser.

The water treatment composition is preferably mixed with the untreated water in a first container at timed intervals using the stirring implement 61, which can be, for example, a spoon or stick. While the stirring implement 61 can be solid, a stirring implement 60 having a plurality of apertures 63 can be used to provide improved mixing. After addition of the water purification composition to the untreated water in the first container, the preferred purification process comprises mixing periods with an inter-mixing wait period between each mixing period, during which time no mixing of the water occurs. There is also a final wait period after the last mixing period prior to pouring the treated water through the filter 30 and into the second container 60.

One or more of the mixing periods is preferably less than about 120 seconds. Optionally, one or more of the mixing periods is between about 5 seconds and about 20 seconds, or between about 50 seconds and about 80 seconds. It is believed that relatively lower turbidities of the water after filtration can be achieved at relatively higher mixing period lengths (e.g. greater than 45 seconds) or relatively lower mixing period lengths (e.g., less than 20 seconds).

One or more of the wait periods (either the inter-mixing wait periods or the final wait period) is preferably less than about 45 minutes. Optionally, the inter-mixing wait periods are between about 1 minute and about 15 minutes, or between about 1 minute and about 4 minutes, or between about 8 minutes and about 12 minutes. The final wait period is optionally less than about 40 minutes or between about 15 minutes and about 30 minutes. It is believed that relatively lower turbidities of the water after filtration can be achieved as the length of the final wait period increases and/or for relatively short intermixing wait periods (e.g., less than about 4 minutes) or relatively longer intermixing wait periods (e.g., greater than about 8 minutes).

It is also believed that as the mixing intensity increases, the turbidity of the filtered water decreases. As used herein, the phrase "mixing intensity" can be characterized by the square root of the power to mix the water divided by the volume of water missed and the water viscosity, as shown below.

$$\text{Mixing intensity} = \sqrt{P}/V\mu$$

wherein P is power, V is the volume of the mixed water, and $\mu$ is the water viscosity. This formula is further discussed in *The Nalco Water Handbook*, 2d edition (1988), published by McGraw Hill Press, the substance of which is incorporated herein by reference. The power can be determined from the torque exerted to rotate the stirring implement 61 multiplied by the angular velocity of the stirring implement. The mixing intensity is preferably less than 3,000 $s^{-1}$ and optionally is between about 400 $s^{-1}$ and about 1800 $s^{-1}$. As the mixing intensity increases, the relaive turbidity of the water after filtration is believed to decrease.

While the above-described purification process is preferred for the water purification compositions and filter materials described herein, it will be appreciated that the length and numbers of mixing periods, inter-mixing wait periods, and final wait periods can be varied.

Passing the purified water through the carbon filter can be done in conjunction with the filtering step or afterward. Examples of the former are where the first filter or one beneath it comprises carbon, as described above. Examples of the latter are the second filters 100, 200 of the second and third embodiments respectively.

The kit can include instructions for using the kit. The instructions can be provided in a text form, in a graphic form, or combination thereof. The instructions can be according to any of the methods of use described herein and may be directly printed on a package storing one or more components of the kit, or printed directly on one or more of the components of the kit (e.g., container 40), or presented in a separate manner including, but not limited to, a brochure, print advertisement, electronic advertisement, and/or verbal communication, so as to communicate the method of using the kit to a consumer. The following is one example of instructions:

1. This packet of powder will purify 10 liters of drinking water. DO NOT LET CHILDREN EAT THE CONTENTS OF THE PACKET.
2. Remove the top bucket and fill it with 10 liters of water.
3. Cut open the packet and add the contents to the container of water.
4. Using the stirring device, stir the powder for 30 seconds.
5. Let the water sit for at least 5 minutes, but never less than 5 minutes.
6. Stir the powder again for 30 seconds.
7. Let the water sit for 5 minutes.
8. Stir for 30 seconds.
9. Let the water sit for 5 minutes.
10. Place the support for the disposable filter onto the rim of the dispenser with the spigot. Place a disposable filter into the support.
11. Separate the clean water from the large particles in the bottom of the bucket by pouring the top layer of clear water through the disposable filter, and into the bottom storage vessel with the spigot. Pour the water through the filter, making sure that all the water goes THROUGH, not around, the filter.
12. If the filtered water is not completely clear, remove the purified water to another container, wash out the bottom storage vessel to remove any small particles, and filter the water again into the cleaned storage vessel with the spigot.
13. Leave the large particles in the bottom layer of water in the bucket. Discard the layer of water containing these large particles on the ground. DO NOT EAT THE ORANGE PARTICLES.
14. After the water has been filtered, let it sit for 15 minutes before drinking it.
15. Keep the purified, filtered water in the storage vessel, keep the vessel closed by placing the cleaned top bucket over the storage vessel, and dispense water only through the spigot.
16. Throw the used disposable filter into the trash. If anyone drinks the orange particles, contact Mercado Empresarial for instructions on what to do.

It should be understood that the present invention is not limited to the preferred embodiments described above, which are illustrative only. Changes may be made in detail, especially in matters of shape, size, arrangement of parts, material or composition of components, and order of steps within the principles of the invention to full extent indicated by the broad general meanings of the terms in which the appended claims are expressed.

We claim:

1. A kit for purifying water, comprising:
   (a) a first container for receiving untreated water and a second container for receiving purified water, wherein said first container has a volume between about 5 liters and about 20 liters;

(b) a water purification composition that, when mixed with water in said first container, produces partially purified water having insoluble matter, wherein said water purification composition is provided in a unit dosage between about 3 grams and about 10 grams;

(c) a filter material; and (d) instructions to:
   (i) mix said water purification composition with between about 5 liters and about 20 liters of water in said first container;
   (ii) stir said combination of said water and said water purification composition;
   (iii) wait;
   (iv) stir said combination of said water and said water purification composition;
   (v) wait;
   (vi) pouring said water through said filter.

2. A kit according to claim 1, wherein said filter comprises cloth.

3. A kit according to claim 1, wherein said filter comprises paper.

4. A kit according to claim 3, wherein said filter comprises cellulosic fibers.

5. A kit according to claim 3, wherein said paper comprises domes.

6. A kit according to claim 3, wherein said filter comprises multiple layers.

7. A kit according to claim 3, wherein said filter is corrugated or pleated.

8. A kit according to claim 1, wherein said flow rate through said filter is at least about 0.1 liters/minute and at said flow rate the turbidity of the filtrate filtered through said filter is no more than about 2.5 NTU.

9. A kit according to claim 1, said filter having pores wherein the pore volume for all pore sizes between 20 $\mu$m and 150 $\mu$m radius is greater than about 0.004 cm$^3$/g/$\mu$m.

10. A kit according to claim 9, said filter having pores wherein the largest concentration of said pores have a pore radius of from about 100 to 200 $\mu$m and a pore volume greater than 0.010 cm$^3$/g/$\mu$m.

11. The kit of claim 1, wherein said instructions further comprise an instruction that said stirring of said step (ii) is less than about 120 seconds.

12. The kit of claim 1, wherein said instructions further comprise an instruction that said waiting of said step (iii) is less than about 45 minutes.

13. The kit of claim 1, wherein said instructions further comprise an instruction that said stirring of said step (iv) is less than about 120 seconds.

14. The kit of claim 1, wherein said instructions further comprise an instruction that said waiting of said step (v) is less than about 45 minutes.

15. The kit of claim 1, wherein said waiting of said step (iii) is between about 1 minute and about 15 minutes.

16. The kit of claim 1, wherein said water purification composition further comprises a first polymeric material and a second polymeric material distinct from said first polymeric material.

17. The kit of claim 16, wherein said first polymeric material comprises an amine group.

18. The kit of claim wherein said first polymeric material is chitosan.

19. The kit of claim 16, wherein said second polymeric material is substantially water soluble and has a weight average molecular weight of at least 2,000,000.

20. The kit of claim 16, wherein said second polymeric material is polyacrylamide.

21. The kit of claim 16, wherein said water purification composition further comprises an inorganic metal salt.

22. The kit of claim 21, wherein said inorganic metal salt is selected from the group consisting of iron sulfate, iron chloride, aluminum chloride, aluminum sulfate, magnesium sulfate, manganese chloride, copper sulfate, copper chloride, and poly-variations thereof or a combination thereof.

23. The kit of claim 1, wherein said unit dosage is provided in a sachet.

24. The kit of claim 23, further comprising between about 1 and about 28 of said sachets.

25. The kit of claim 16, wherein said water purification composition further comprises a water-insoluble silicate selected from the group consisting of clays, zeolites, and mixtures thereof.

26. A method of using a water purification kit, comprising:
   (a) mixing between about 3 grams and about 10 grams of a water purification composition with between about 5 liters and about 20 liters of water in a first container, wherein said water purification composition comprises a first polymeric material and a second polymeric material distinct from said first polymeric material;
   (b) stirring said combination of said water and said water purification composition; then
   (c) waiting; then
   (d) stirring said combination of said water and said water purification composition; then
   (e) waiting; and
   (f) pouring said water through a filter into a second container.

27. The method of claim 26, wherein said stirring of said step (b) is less than about 120 seconds.

28. The method of claim 26, wherein said waiting of said step (c) is less than about 45 minutes.

29. The method of claim 26, wherein said stirring of said step (d) is less than about 120 seconds.

30. The method of claim 26, wherein said waiting of said step (e) is less than about 45 minutes.

31. The method of claim 26, wherein said waiting of said step (c) is between about 1 minute and about 15 minutes.

32. The kit of claim 26, wherein said first polymeric material comprises an amine group.

33. The kit of claim 32, wherein said first polymeric material is chitosan.

34. The kit of claim 32, wherein said second polymeric material is substantially water soluble and has a weight average molecular weight of at least 2,000,000.

35. The kit of claim 34, wherein said second polymeric material is polyacrylamide.

36. The kit of claim 34, wherein said water purification composition further comprises an inorganic metal salt.

37. The kit of claim 36, wherein said inorganic metal salt is selected from the group consisting of iron sulfate, iron chloride, aluminum chloride, aluminum sulfate, magnesium sulfate, manganese chloride, copper sulfate, copper chloride, and poly-variations thereof or a combination thereof.

38. The kit of claim 26, wherein said water purification composition further comprises a water-insoluble silicate selected from the group consisting of clays, zeolites, and mixtures thereof.

39. The kit of claim 26, wherein said unit dosage is provided in a sachet.

40. The kit of claim 39, further comprising between about 1 and about 28 of said sachets.

* * * * *